United States Patent
Chen et al.

(10) Patent No.: US 9,083,210 B2
(45) Date of Patent: Jul. 14, 2015

(54) SILICON STEEL ASSEMBLY AND ASSEMBLING METHOD THEREOF

(75) Inventors: Hou-Chu Chen, Taoyuan Hsien (TW); Chin-Chu Hsu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 403 days.

(21) Appl. No.: 13/228,840

(22) Filed: Sep. 9, 2011

(65) Prior Publication Data

US 2012/0062066 A1 Mar. 15, 2012

(30) Foreign Application Priority Data

Sep. 10, 2010 (TW) .............................. 99130604 A

(51) Int. Cl.
  *H02K 1/14* (2006.01)
  *H02K 3/52* (2006.01)
  *H02K 15/02* (2006.01)

(52) U.S. Cl.
  CPC ................ *H02K 1/148* (2013.01); *H02K 3/522* (2013.01); *H02K 15/022* (2013.01); *Y10T 29/49012* (2015.01)

(58) Field of Classification Search
  None
  See application file for complete search history.

(56) References Cited

U.S. PATENT DOCUMENTS

| | | | | |
|---|---|---|---|---|
| 3,882,336 A * | 5/1975 | Boyd et al. | ............. | 310/216.115 |
| 4,818,911 A * | 4/1989 | Taguchi et al. | ........ | 310/216.105 |
| 6,144,135 A * | 11/2000 | Ho | .......... | 310/216.079 |
| 6,608,420 B2 * | 8/2003 | Hsieh | .......... | 310/254.1 |
| 6,654,213 B2 * | 11/2003 | Horng et al. | .......... | 361/23 |
| 6,670,736 B2 * | 12/2003 | Horng et al. | .......... | 310/194 |
| 7,211,918 B2 * | 5/2007 | Migita et al. | .......... | 310/215 |
| 7,262,540 B2 * | 8/2007 | Lee | .......... | 310/216.004 |
| 7,732,969 B2 | 6/2010 | Ishizeki et al. | | |
| 8,247,935 B2 * | 8/2012 | Onozawa et al. | .......... | 310/68 B |
| 2005/0194860 A1* | 9/2005 | Lee | .......... | 310/217 |
| 2006/0012261 A1* | 1/2006 | Ku et al. | .......... | 310/215 |
| 2006/0138893 A1* | 6/2006 | Noda et al. | .......... | 310/215 |
| 2009/0324435 A1* | 12/2009 | Sears et al. | .......... | 417/423.7 |

FOREIGN PATENT DOCUMENTS

EP        1936778        6/2008

* cited by examiner

*Primary Examiner* — Tran Nguyen
(74) *Attorney, Agent, or Firm* — Kirton McConkie; Evan R. Witt

(57) ABSTRACT

A silicon steel assembly includes a first cover, a second cover, plural tooth members and an outer ring. The second cover has plural recesses. The tooth members are accommodated within respective recesses of the second cover. The first cover, the tooth members and the second cover are combined together to form a combination structure. The outer ring is sheathed around an outer periphery of the combination structure.

11 Claims, 7 Drawing Sheets

SILICON STEEL ASSEMBLY AND ASSEMBLING METHOD THEREOF

FIELD OF THE INVENTION

The present invention relates to a silicon steel assembly, and more particularly to a silicon steel assembly of an inner-rotor type motor. The present invention relates to a method for assembling such a silicon steel assembly.

BACKGROUND OF THE INVENTION

Generally, electric motors are classified into two types: i.e. inner-rotor type motors and outer-rotor type motors. During operation of the inner-rotor type motor, the rotor is rotated within the stator of the motor. Whereas, during operation of the outer-rotor type motor, the rotor is rotated around the stator of the motor.

Moreover, the silicon steel of the motor stator is usually an integral part. FIG. 1A is a schematic top view illustrating a conventional inner-rotor type motor. As shown in FIG. 1A, the motor 1 comprises an outer frame 10, a stator 11 and a rotor 12. The stator 11 and the rotor 12 are accommodated in the receptacle within the outer frame 10. The stator 11 has a ring-shaped structure. The rotor 12 may be connected with a load (not shown). In addition, the rotor 12 is disposed within the ring-shaped structure of the stator 11.

FIG. 1B is a schematic enlarged fragmentary view of the circled portion of the motor as shown in FIG. 1A. Please refer to FIGS. 1A and 1B. The stator 11 comprises a housing 13 and a silicon steel sheet 14, which are integrally formed as the ring-shaped structure. In addition, plural T-shaped tooth members 15 are formed on the ring-shaped stator 11, and a coil 16 is wound around the base parts 150 of the T-shaped tooth members 15. When the motor 1 is turned on, electricity flows through the coil 16 to generate a magnetic field. Since the magnetic field of the rotor is opposite to the magnetic field of the stator, the two magnetic fields repel each other to result in a continuous rotation of the rotor 12 and the load connected thereto.

Conventionally, the housing 13 and the silicon steel sheet 14 of the stator 11 are firstly integrally formed by a plastic injection molding process, and then the coil 16 is wound around the base parts 150 of the T-shaped tooth members 15. As known, the outer ring 17 and the narrow space between any two adjacent T-shaped tooth members 15 become hindrance from winding the coil 16 around the base parts 150. In addition, if the coil 16 is contacted with the T-shaped tooth members 15, the covering of the coil 16 is readily damaged. Since the process of internally winding the ring 17 is time-consuming, the throughput of the silicon steel assembly 1 is low. For increasing the throughput, the number of winding machines needs to be increased. In other words, the conventional method of fabricating the silicon steel assembly is not cost-effective and the product competitiveness is unsatisfied.

For obviating the drawbacks encountered from the prior art, there is a need of providing a silicon steel assembly and an assembling method thereof.

SUMMARY OF THE INVENTION

It is an object of the present invention to provide a silicon steel assembly of an inner-rotor type motor and an assembling method thereof to fabricate the silicon steel assembly in a simplified, time-saving and cost-effective manner.

In accordance with an aspect of the present invention, there is provided a silicon steel assembly. The silicon steel assembly includes a first cover, a second cover, plural tooth members and an outer ring. The second cover has plural recesses. The tooth members are accommodated within respective recesses of the second cover. The first cover, the tooth members and the second cover are combined together to form a combination structure. The outer ring is sheathed around an outer periphery of the combination structure.

In an embodiment, the silicon steel assembly further includes a coil, which is wound around the combination structure.

In an embodiment, the recesses have respective first positioning structures, and the tooth members have respective second positioning structures to be engaged with the first positioning structures.

In an embodiment, the first positioning structure is a raised block, and the second positioning structure is an indentation corresponding to the raised block.

In an embodiment, the first positioning structure is an indentation, and the second positioning structure is a raised block corresponding to the indentation.

In an embodiment, the first cover comprises a first inner ring and plural first protrusions connected with the first inner ring, and the second cover comprises a second inner ring and plural second protrusions connected with the second inner ring.

In an embodiment, at least one pin is formed on a distal end of the second protrusion.

In an embodiment, the first inner ring of the first cover comprises a first ring-shaped groove, the first protrusions have respective receiving parts, the second inner ring of the second cover comprises a second ring-shaped groove, and the second protrusions have respective recesses.

In an embodiment, the plural tooth members are T-shaped and include respective post parts and respective arc parts. For combining the tooth member with the first cover and the second cover, the upper-half portions of the post parts of the tooth members are accommodated within respective receiving parts of the first protrusions of the first cover, the lower-half portions of the post parts of the tooth members are accommodated within respective recesses of the second protrusions of the second cover, the upper-half portions of the arc parts of the tooth members are accommodated within the first ring-shaped groove, and the lower-half portions of the arc parts of the tooth members are accommodated within the second ring-shaped groove.

In an embodiment, the post parts of the tooth members have respective engaging ends, and the outer ring has notches corresponding to the engaging ends. After the first cover, the tooth members and the second cover are combined together to form the combination structure, the engaging ends are protruded outside the first protrusions and the second protrusions and engaged with corresponding notches of the outer ring.

In accordance with an aspect of the present invention, there is provided a method for assembling a silicon steel assembly of an inner-rotor type motor. The method includes steps of: (a) providing a first cover, a second cover, plural tooth members and an outer ring, wherein the second cover comprises plural recesses, (b) accommodating the plural tooth members within the recesses of the second cover, (c) combining the first cover, the plural tooth members and the second cover together to form a combination structure, and (d) sheathing the outer ring around an outer periphery of the combination structure.

In an embodiment, after the step (c), the method further comprises a step (c1) of providing a coil, and externally winding the coil around the combination structure.

In an embodiment, the recesses have respective first positioning structures, and the tooth members have respective second positioning structures corresponding to the first positioning structures. In the step (b), the first positioning structures and the second positioning structures are respectively engaged with each other for facilitating fixing the tooth members within the recesses of the second cover.

In an embodiment, the first cover further comprises plural receiving parts corresponding to the tooth members.

In an embodiment, plural tooth members are T-shaped and include respective post parts and respective arc parts. For combining the tooth member with the first cover and the second cover in the step (c), the upper-half portions of the post parts of the tooth members are accommodated within respective receiving parts of the first cover, and the lower-half portions of the post parts of the tooth members are accommodated within respective recesses of the second cover.

In an embodiment, the post parts of the tooth members have respective engaging ends, and the outer ring has notches corresponding to the engaging ends. After the first cover, the tooth members and the second cover are combined together to form the combination structure, the engaging ends are protruded outside the first protrusions and the second protrusions. When the outer ring is sheathed around the outer periphery of the combination structure in the step (d), the engaging ends are engaged with corresponding notches of the outer ring for facilitating fixing the outer ring on the combination structure.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
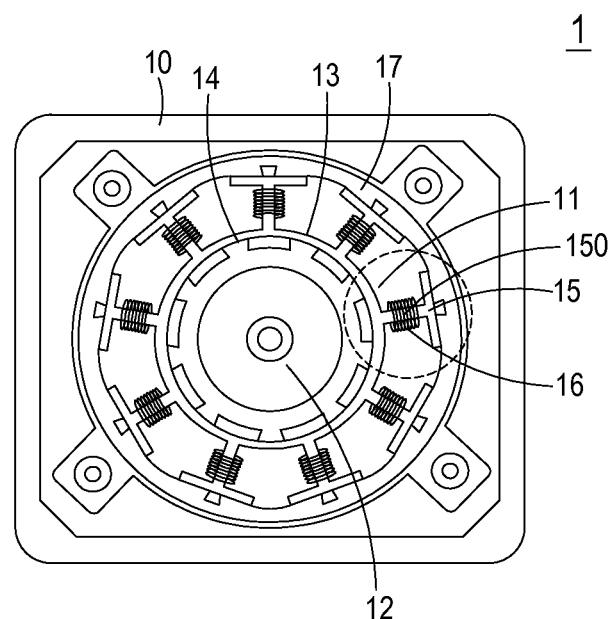
FIG. 1A is a schematic top view illustrating a conventional inner-rotor type motor.
Figure 1B:
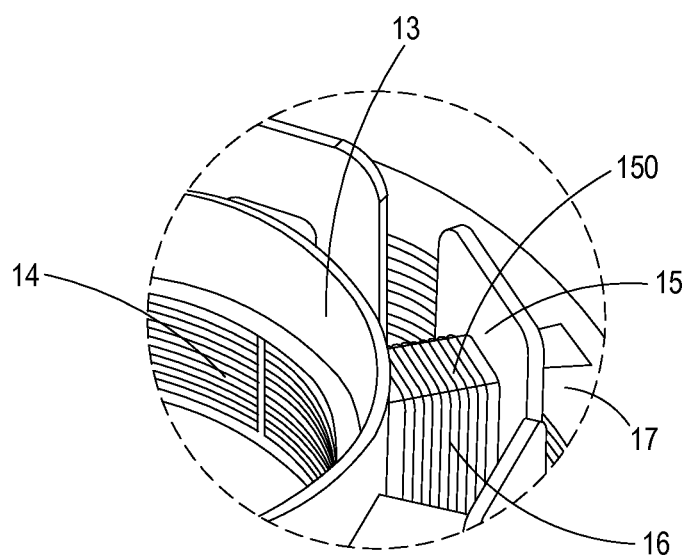
FIG. 1B is schematic enlarged fragmentary view of the circled portion of the motor as shown in FIG. 1A.
Figure 2:
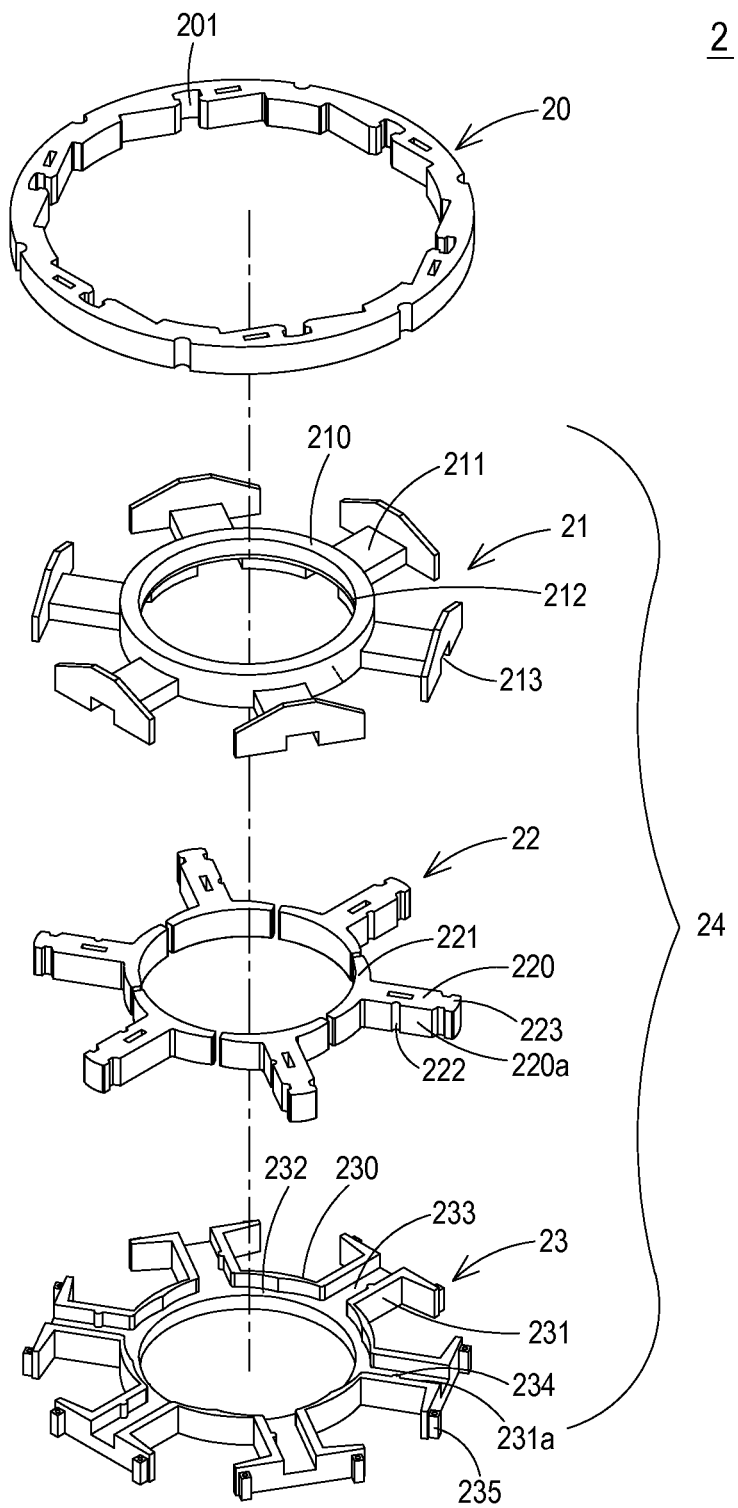
FIG. 2 is a schematic exploded view illustrating a silicon steel assembly according to an embodiment of the present invention.

FIG. 2 is a schematic exploded view illustrating a silicon steel assembly according to an embodiment of the present invention. The silicon steel assembly 2 is applied to an inner-rotor type motor. As shown in FIG. 2, the silicon steel assembly 2 comprises an outer ring 20, an upper cover 21, plural tooth members 22 and a lower cover 23. Firstly, the upper cover 21, the tooth members 22 and the lower cover 23 are combined together to form a combination structure 24. Then, a coil 25 is wound around the combination structure 24. Afterwards, the outer ring 20 is sheathed around the outer periphery of the combination structure 24, and thus the silicon steel assembly 2 is assembled.

In this embodiment, the upper cover 21 and the lower cover 23 have central hollow portions. In addition, the upper cover 21 and the lower cover 23 are made of plastic material. The outer ring 20 and the tooth members 22 are made of metallic material (e.g. silicon steel). The upper cover 21 comprises a first inner ring 210 and plural first protrusions 211. The first protrusions 211 are disposed around and connected with the first inner ring 210. The first inner ring 210 is a ring structure with a central hollow portion and includes a first ring-shaped groove 212. The first protrusions 211 are T-shaped structure connected with the first inner ring 210. In addition, the first protrusions 211 have respective receiving parts 213.

The configurations of the lower cover 23 are similar to those of the upper cover 21. The lower cover 23 comprises a second inner ring 230 and plural second protrusions 231. The second protrusions 231 are disposed around and connected with the second inner ring 230. The second inner ring 230 is also a ring structure with a central hollow portion and includes a second ring-shaped groove 232. The second protrusions 231 are also T-shaped structure connected with the second inner ring 230. In addition, the second protrusions 231 have respective recesses 233. Moreover, the recess 233 further includes a first positioning structure 234 disposed on a first side wall 231a. In this embodiment, the first positioning structure 234 is a raised block to be engaged with a corresponding indentation. Alternatively, the first positioning structure 234 is an indentation to be engaged with a corresponding raised block. Moreover, at least one pin 235 is formed on the distal end of the protrusion 231 of the lower cover 23. After the silicon steel assembly 2 is mounted on a circuit board (not shown), the silicon steel assembly 2 is electrically connected with the circuit board via the pins 235.

Figure 3A:
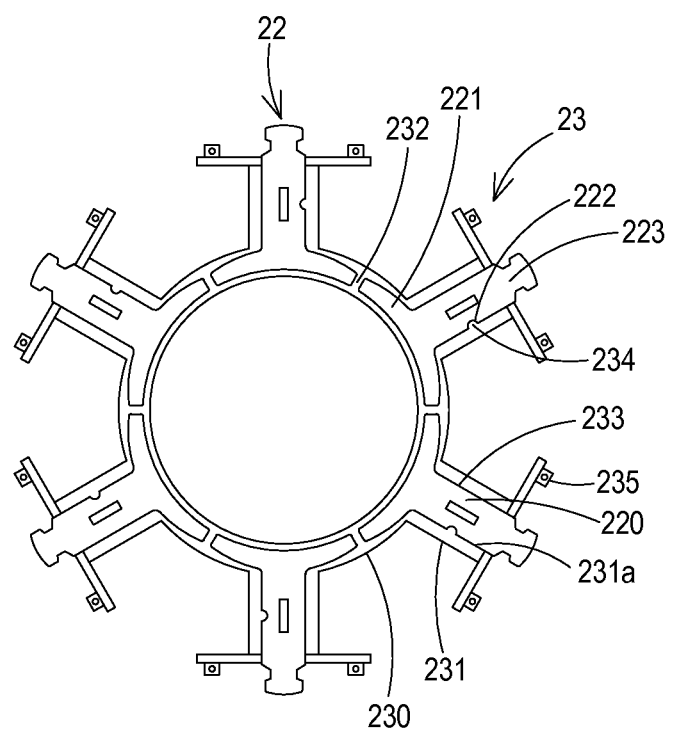
FIG. 3A is a schematic top view illustrating a combination of the plural tooth members and the lower cover of the silicon steel assembly as shown in FIG. 2.
Figure 3B:
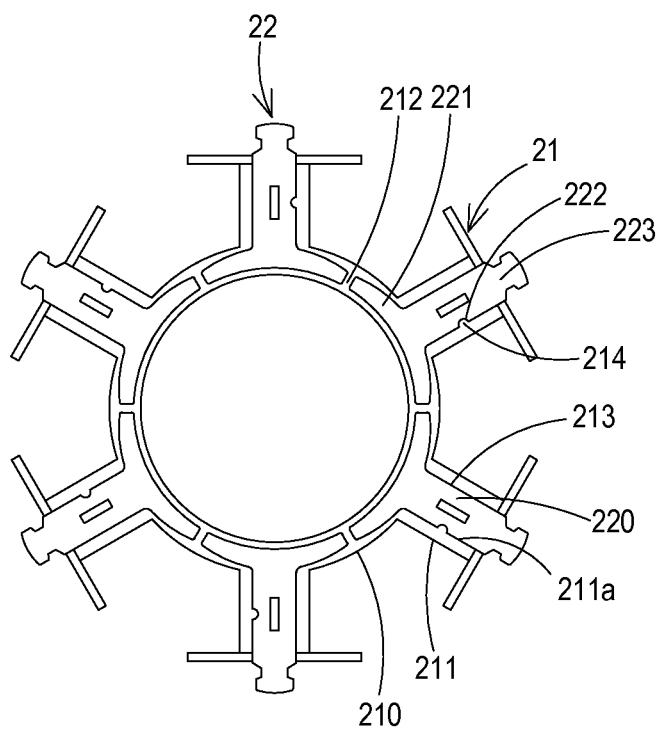
FIG. 3B is a schematic bottom view illustrating a combination of the plural tooth members and the upper cover of the silicon steel assembly as shown in FIG. 2.

FIG. 3A is a schematic top view illustrating a combination of the plural tooth members and the lower cover of the silicon steel assembly as shown in FIG. 2, and FIG. 3B is a schematic bottom view illustrating a combination of the plural tooth members and the upper cover of the silicon steel assembly as shown in FIG. 2. Please refer to FIGS. 2, 3A and 3B. The tooth members 22 are substantially T-shaped. Each of the tooth members 22 comprises a post part 220 and an arc part 221. A first end of the post part 220 is connected with the arc part 221. A second end of the post part 220 is formed as an engaging end 223. Corresponding to the first positioning structure 234, which is axially extended and protruded on a side wall 231a of the recess 233 of the lower cover 23, the post part 220 further comprises a second positioning structure 222, which is axially extended and disposed on a side wall 220a of the post part 220. The second positioning structure 222 may be engaged with the first positioning structure 234. In a case that the first positioning structure 234 of the recess 233 is a raised block, the second positioning structure 222 of the tooth member 22 is an indentation. Whereas, in a case that the first positioning structure 234 of the recess 233 is an indentation, the second positioning structure 222 of the tooth member 22 is a raised block. Similarly, in the upper cover 21 shown in FIG. 3B, there is a third positioning structure 214 axially extended and protruded on a side wall 211a of the receiving part 213, and the third positioning structure 214 is engaged with the second positioning structure 222 of the tooth member 22 as well.

Please refer to FIGS. 2, 3A and 3B again. For combining the tooth member 22 with the lower cover 23, the lower-half portions of the post parts 220 of the tooth members 22 are accommodated within respective recesses 233 of the second protrusions 231 of the lower cover 23 while the lower-half portions of the arc parts 221 of the tooth members 22 are accommodated within the second ring-shaped groove 232. In addition, since the first positioning structures 234 and the second positioning structures 222 are engaged with each other, the tooth members 22 can be securely accommodated within the recesses 233 of the lower cover 23. Similarly, for combining the tooth member 22 with the upper cover 21, the upper-half portions of the post parts 220 of the tooth members 22 are accommodated within respective receiving parts 213 of the first protrusions 211 of the upper cover 21 while the upper-half portions of the arc parts 221 of the tooth members 22 are accommodated within the first ring-shaped groove 212. In addition, since the third positioning structures 214 and the second positioning structures 222 are engaged with each other, the tooth members 22 can be securely accommodated within the receiving parts 213 of the upper cover 21.

Figure 4:
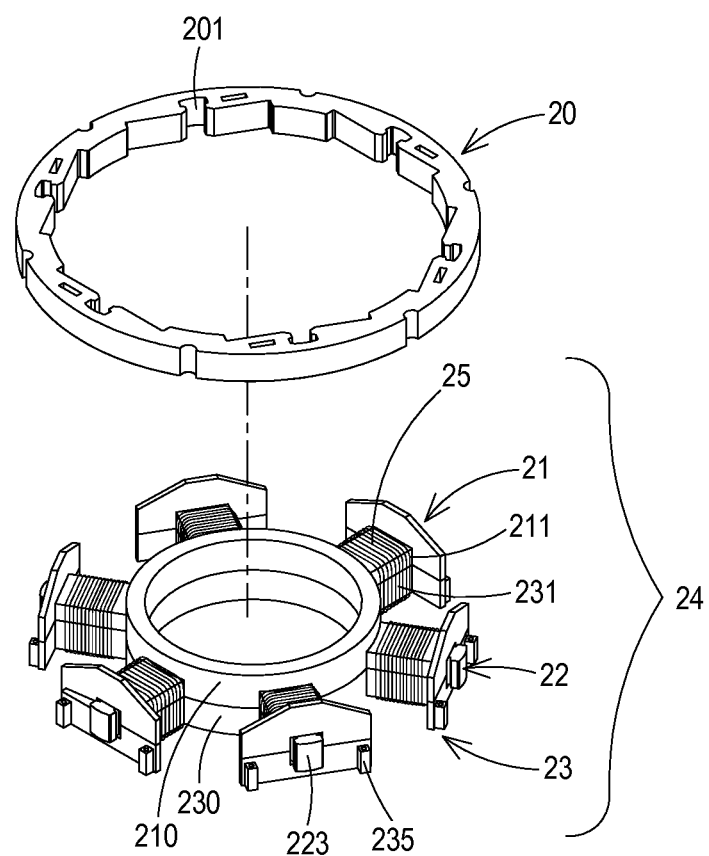
FIG. 4 is a schematic perspective view illustrating a combination structure of the upper cover, the plural tooth members and the lower cover of the silicon steel assembly according to an embodiment of the present invention.

Please refer to FIGS. 2 and 4. After the tooth members 22 are securely accommodated within the recesses 233 of the lower cover 23, the upper-half portions of the post parts 220 of the tooth members 22 are accommodated within respective receiving parts 213 of the first protrusions 211 of the upper cover 21, and the upper-half portions of the arc parts 221 of the tooth members 22 are accommodated within the first ring-shaped groove 212. Consequently, the upper cover 21, the plural tooth members 22 and the lower cover 23 are combined together to form the combination structure 24, as shown in FIG. 4.

In some embodiments, the tooth members 22 are bilaterally symmetrical T-shaped structures, and the arc parts 221 of the tooth members 22 collectively define a circular profile. In some embodiments, the tooth members 22 are bilaterally asymmetrical T-shaped structures. For combining the tooth members 22 with the upper cover 21 and the lower cover 23, the second positioning structures 222 of the tooth members 22 should be engaged with the third positioning structures (not shown) of the upper cover 21 and the first positioning structures 234 of the lower cover 23. In such way, the tooth members 22 can be actually positioned.

Please refer to FIG. 4 again. After the upper cover 21, the plural tooth members 22 and the lower cover 23 are combined together to form the combination structure 24, the engaging ends 223 at the second ends of the post parts 220 of the tooth members 22 are protruded outside the first protrusions 211 of the upper cover 21 and the second protrusions 231 of the lower cover 23. The engaging ends 223 may be engaged with corresponding notches 201 of the outer ring 20. Moreover, after the upper cover 21, the plural tooth members 22 and the lower cover 23 are combined together to form the combination structure 24, a coil 25 may be wound around the first protrusions 211 and the second protrusions 231 of the combination structure 24 by a winding method of the silicon steel assembly of the common outer-rotor type motor. That is, the coil 25 is externally wound around the combination structure 24. After the coil 25 is wound around the combination structure 24, the outer ring 20 is sheathed around the combination structure 24. Meanwhile, the silicon steel assembly 2 is assembled. In comparison with the internal winding method of the conventional inner-rotor type motor, the method of externally winding the coil 25 around the combination structure 24 is simplified, time-saving and cost-effective. That is, the throughput and product competitiveness of the silicon steel assembly of the present invention are largely enhanced.

Figure 5:
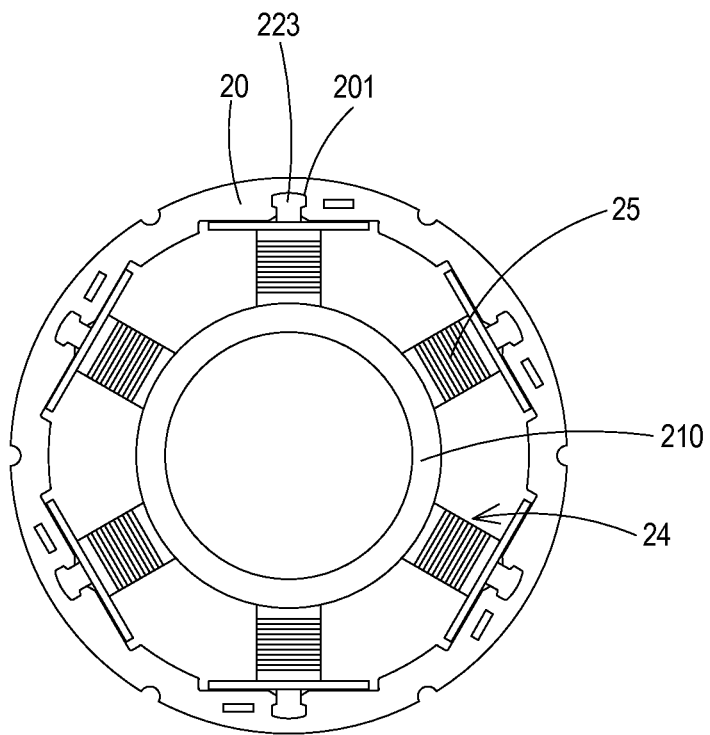
FIG. 5 is a schematic top view illustrating the silicon steel assembly according to an embodiment of the present invention.

FIG. 5 is a schematic top view illustrating the silicon steel assembly according to an embodiment of the present invention. After the outer ring 20 is sheathed around the combination structure 24, the engaging ends 223 of the combination structure 24 are engaged with corresponding notches 201 of the outer ring 20. Consequently, the outer ring 20 can be securely fixed on the combination structure 24. Afterwards, silicon steel assembly 2 may be applied to a stator of an inner-rotor type motor.

Figure 6:
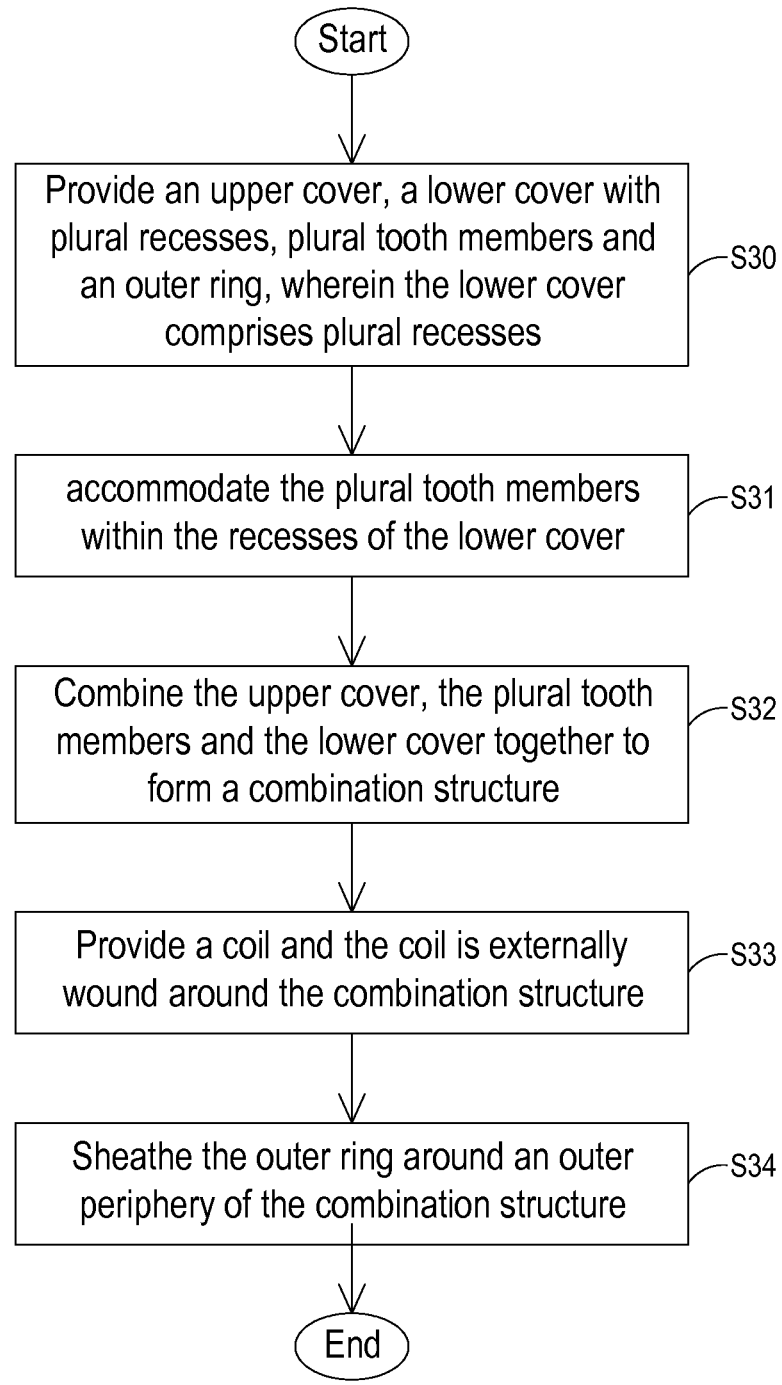
FIG. 6 is a flowchart illustrating a method of assembling the silicon steel assembly according to an embodiment of the present invention.

FIG. 6 is a flowchart illustrating a method of assembling the silicon steel assembly according to an embodiment of the present invention. Please refer to FIGS. 2-6. First of all, in the step S30, an outer ring 20, an upper cover 21, plural tooth members 22 and a lower cover 23 are provided. The lower cover 23 comprises a second inner ring 230 and plural second protrusions 231. The second inner ring 230 further includes a second ring-shaped groove 232. The second protrusions 231 have respective recesses 233. Then, in the step S31, the tooth members 22 are aligned with the recesses 233 of the second protrusions 231 of the lower cover 23, the second positioning structures 222 of the post parts 220 of the tooth members 22 are engaged with corresponding first positioning structures 234 of the second protrusions 231 of the lower cover 23, and the tooth members 22 are accommodated within respective recesses 233 of the lower cover 23. Then, in the step S32, the first inner ring 210 and the first protrusions 211 of the upper cover 21 are respectively placed on the arc parts 221 and the posts parts 220 of the tooth members 22, and the second inner ring 230 and the second protrusions 231 of the lower cover 23. Consequently, the tooth members 22 are assembled between the upper cover 21 and the lower cover 23 to define the combination structure 24. Meanwhile, the engaging ends 223 at the second ends of the post parts 220 of the tooth members 22 are protruded outside the first protrusions 211 of the upper cover 21 and the second protrusions 231 of the lower cover 23. Then, in the step S33, a coil 25 is provided and wound around the first protrusions 211 and the second protrusions 231 of the combination structure 24. Afterwards, in the step S34, the outer ring 20 is sheathed around the outer periphery of the combination structure 24 while the notches 201 of the outer ring 20 are engaged with the engaging ends 223 of the combination structure 24. Meanwhile, the silicon steel assembly 2 is assembled.

As previously described, the conventional method of internally winding the silicon steel assembly of the inner-rotor type motor is time-consuming. Whereas, since the coil is externally wound around the combination structure of the silicon steel assembly according to the present invention, the winding method of the silicon steel assembly is time-saving. Moreover, since the silicon steel assembly of the present invention is fabricated by successively combining the tooth structures, lower cover, the upper cover and the outer ring together, the assembling method of the silicon steel assembly is simplified. Since the plastic injection molding process is eliminated, the assembling method of the silicon steel assembly is simplified, time-saving and cost-effective. In this situation, the throughput and product competitiveness of the silicon steel assembly of the present invention are largely enhanced.

From the above description, the silicon steel assembly of the present invention is fabricated by combining the tooth structures, lower cover, the upper cover and the outer ring together. The tooth structures are accommodated within corresponding recesses of the lower cover, and sandwiched between the upper cover and the lower cover to define a combination structure. Then, the coil is externally wound around the combination structure. Afterwards, the outer ring is sheathed around the combination structure, and thus the silicon steel assembly is assembled. Since the process of winding the coil is simplified, the assembling method of the silicon steel assembly is simplified, time-saving and cost-effective.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A silicon steel assembly, comprising:
   a first cover comprising a first inner ring and plural first protrusions disposed around and connected with the first inner ring, each first protrusion having a receiving part that includes a third positioning structure axially extended and protruded on a side wall of the receiving part;
   a second cover comprising a second inner ring and plural second protrusions disposed around and connected with the second inner ring, each second protrusion having a recess that includes a first positioning structure axially extended and protruded on a side wall of the recess, each recess of the second cover conforming to and coupling with a corresponding receiving part of the first cover;
   a plurality of tooth members circularly disposed around an axis and accommodated within respective receiving part of the first cover and within respective recesses of the second covers, the tooth members having post parts and arc parts, the arc parts are collectively define a circular profile around the axis, and the post parts are extended from the arc parts and away from the axis, each post part having a second positioning structure axially extended and disposed on a side wall of the post part that engages with a corresponding third positioning structure of the first cover and a corresponding first positioning structure of the second cover to maintain a position of the tooth member within the receiving part and the recess, wherein, when in the position, the upper-half portions of said post parts of said tooth members are accommodated within respective receiving parts of the first protrusions of the first cover, the lower-half portions of the post parts of said tooth members are accommodated within respective recesses of the second protrusions of the second cover, and the tooth members extend outwardly beyond a distal end of the first and second protrusions; and
   an outer ring, wherein the first cover, the tooth members and the second cover are combined together to form a combination structure, and the outer ring is sheathed around an outer periphery of the combination structure.

2. The silicon steel assembly according to claim 1 wherein said silicon steel assembly further includes a coil that is wound around the combination structure.

3. The silicon steel assembly according to claim 1 wherein the first positioning structure is a raised block, and the second positioning structure is an indentation corresponding to the raised block.

4. The silicon steel assembly according to claim 1 wherein the first positioning structure is an indentation, and the second positioning structure is a raised block corresponding to the indentation.

5. The silicon steel assembly according to claim 1 wherein at least one pin is formed on the distal end of the second protrusion.

6. The silicon steel assembly according to claim 1 wherein the first inner ring of the first cover comprises a first ring-shaped groove, and wherein said second inner ring of the second cover comprises a second ring-shaped groove.

7. The silicon steel assembly according to claim 6 wherein the upper-half portions of the arc parts of the tooth members are accommodated within the first ring-shaped groove, and the lower-half portions of the arc parts of the tooth members are accommodated within the second ring-shaped groove.

8. The silicon steel assembly according to claim 1 wherein the post parts of the tooth members have respective engaging ends, and the outer ring has notches corresponding to the engaging ends in which the engaging ends insert.

9. A method for assembling a silicon steel assembly of an inner-rotor type motor, said method comprising steps of:
   (a) providing a first cover, a second cover, a plurality of tooth members and an outer ring, wherein the first cover comprises a first inner ring and a plurality of first protrusions disposed around and connected with the first inner ring, each first protrusion having a receiving part that includes a third positioning structure axially extended and protruded on a side wall of the receiving part, and wherein the second cover comprises a second inner ring and a plurality of second protrusions disposed around and connected with the second inner ring, each second protrusion having a recess that includes a first positioning structure axially extended and protruded on a side wall of the recess, each recess of the second cover conforming to and coupling with a corresponding receiving part of the first cover, the tooth members having post parts and arc parts, the arc parts are collectively define a circular profile around the axis, and the post parts are extended from the arc parts and away from the axis, each post part having a second positioning structure axially extended and disposed on a side wall of the post part;
   (b) accommodating the plurality of tooth members within the recesses of the second cover such that the second positioning structures are engaged with the first positioning structures to maintain a position of the tooth members within the recesses;
   (c) placing the first cover over the plurality of tooth members such that the tooth members are within the receiving parts of the first cover and within the recesses of the second cover to form a combination structure, wherein the upper-half portions of said post parts of the tooth members are accommodated within respective receiving parts of the first cover, and the lower-half portions of the post parts of the tooth members are accommodated within respective recesses of the second cover, and each post part extending outwardly beyond a distal end of the first and second protrusions; and
   (d) sheathing the outer ring around an outer periphery of the combination structure.

10. The method according to claim 9 wherein after the step (c), the method further comprises a step (c1) of providing a coil, and externally winding the coil around said combination structure.

11. The method according to claim 9 wherein the post parts of the tooth members have respective engaging ends, and the outer ring has notches corresponding to the engaging ends, and wherein when the outer ring is sheathed around the outer periphery of the combination structure in step (d), the engaging ends are engaged with corresponding notches of the outer ring for facilitating fixing the outer ring on the combination structure.

* * * * *